US011783410B2

United States Patent
Greenberg et al.

(10) Patent No.: US 11,783,410 B2
(45) Date of Patent: Oct. 10, 2023

(54) ONLINE DATA MARKET FOR AUTOMATED PLANT GROWTH INPUT CURVE SCRIPTS

(71) Applicant: iUNU, Inc., Seattle, WA (US)

(72) Inventors: Adam Phillip Takla Greenberg, Seattle, WA (US); Matthew Charles King, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 0 days.

(21) Appl. No.: 17/959,240

(22) Filed: Oct. 3, 2022

(65) Prior Publication Data
US 2023/0028546 A1    Jan. 26, 2023

Related U.S. Application Data

(62) Division of application No. 15/271,749, filed on Sep. 21, 2016, now Pat. No. 11,538,099.

(51) Int. Cl.
*A01G 25/16* (2006.01)
*G06Q 20/12* (2012.01)
(Continued)

(52) U.S. Cl.
CPC .............. *G06Q 30/08* (2013.01); *A01G 22/00* (2018.02); *A01G 25/165* (2013.01); *G05B 15/02* (2013.01);
(Continued)

(58) Field of Classification Search
CPC .... G06Q 30/08; G06Q 20/12; G06Q 30/0207; G06Q 30/0601; G06Q 50/02;
(Continued)

(56) References Cited

U.S. PATENT DOCUMENTS

| 5,841,883 A | 11/1998 | Kono et al. |
| 7,013,284 B2 | 3/2006 | Guyan et al. |

(Continued)

FOREIGN PATENT DOCUMENTS

| CA | 3037004 A1 | 3/2018 |
| CA | 3038966 A1 | 3/2018 |

(Continued)

OTHER PUBLICATIONS

Augustin et al., "A framework for the extration of quantitative traits from 2D images of mature *Arabidopsis thaliana*," Machine Vision and Applications, vol. 27, Issue 5 (Oct. 16, 2015), pp. 647-661.

(Continued)

*Primary Examiner* — Kenneth M Lo
*Assistant Examiner* — Mohammed Shafayet
(74) *Attorney, Agent, or Firm* — Han Santos, PLLC

(57) ABSTRACT

This disclosure describes techniques that facilitate the sale and exchange of plant growth systems to consumer plant growers. Particularly, a script offering system may act as an intermediary medium that allows merchants to advertise plant growth scripts to consumer plant growers via an electronic marketplace. In some examples, the script offering system may allow merchants to advertise plant growth scripts to consumer plant growers that have expressed an interest or need for a particular plant growth script. In other examples, the script offering system may allow a consumer plant grower to solicit merchant bids for the sale of plant growth script. A consumer plant grower may solicit bids for plant growth scripts that address specific needs identified via key word inputs or sensor data attributable to an existing plant growth operation that exhibits less than optimal plant growth.

20 Claims, 9 Drawing Sheets

(51) Int. Cl.
　　　*G05B 15/02* (2006.01)
　　　*G06Q 30/08* (2012.01)
　　　*G06Q 30/0601* (2023.01)
　　　*A01G 22/00* (2018.01)
　　　*G06Q 50/02* (2012.01)
　　　*G06Q 30/0207* (2023.01)

(52) U.S. Cl.
　　　CPC ......... *G06Q 20/12* (2013.01); *G06Q 30/0207* (2013.01); *G06Q 30/0601* (2013.01); *G06Q 50/02* (2013.01)

(58) Field of Classification Search
　　　CPC ........ A01G 22/00; A01G 25/165; A01G 7/00; G05B 15/02; Y02P 60/21
　　　See application file for complete search history.

(56) References Cited

U.S. PATENT DOCUMENTS

| | | | |
|---|---|---|---|
| 7,184,846 | B2 | 2/2007 | Albright et al. |
| 7,711,576 | B1 | 5/2010 | Duett et al. |
| 8,145,330 | B2 | 3/2012 | Emoto |
| 8,249,926 | B2 | 8/2012 | Avey et al. |
| 8,594,375 | B1 | 11/2013 | Padwick |
| 8,613,158 | B2 | 12/2013 | Conrad |
| 8,850,742 | B2 | 10/2014 | Dubé |
| 9,565,812 | B2 | 2/2017 | Wilson |
| 9,603,316 | B1 | 3/2017 | Mansey et al. |
| 9,779,442 | B1 | 10/2017 | Cimic et al. |
| 10,002,375 | B1 | 6/2018 | Scythes et al. |
| 10,339,380 | B2 | 7/2019 | Greenberg et al. |
| 10,635,274 | B2 | 4/2020 | Greenberg et al. |
| 10,791,037 | B2 | 9/2020 | Greenberg et al. |
| 11,062,516 | B2 | 7/2021 | Greenberg et al. |
| 11,244,398 | B2 | 2/2022 | Greenberg et al. |
| 11,347,384 | B2 | 5/2022 | Greenberg et al. |
| 11,411,841 | B2 | 8/2022 | Greenberg et al. |
| 2002/0082982 | A1* | 6/2002 | Mock .................. G06Q 10/06 705/37 |
| 2003/0227487 | A1 | 12/2003 | Hugh |
| 2004/0231240 | A1 | 11/2004 | Kuiper et al. |
| 2005/0072862 | A1 | 4/2005 | Skinner |
| 2006/0196116 | A1 | 9/2006 | Zettl |
| 2007/0065857 | A1 | 3/2007 | Glaser et al. |
| 2007/0179854 | A1 | 8/2007 | Ziv et al. |
| 2007/0289207 | A1* | 12/2007 | May .................. A01G 9/16 47/17 |
| 2008/0066072 | A1 | 3/2008 | Yurekli et al. |
| 2009/0005247 | A1 | 1/2009 | Spiegel et al. |
| 2009/0112789 | A1 | 4/2009 | Oliveira et al. |
| 2009/0132543 | A1 | 5/2009 | Chatley et al. |
| 2009/0144284 | A1 | 6/2009 | Chatley et al. |
| 2009/0164741 | A1 | 6/2009 | Takaki |
| 2010/0305966 | A1 | 12/2010 | Coulter et al. |
| 2011/0047636 | A1 | 2/2011 | Stachon et al. |
| 2011/0090960 | A1 | 4/2011 | Leontaris et al. |
| 2011/0137757 | A1 | 6/2011 | Paolini et al. |
| 2011/0196710 | A1 | 8/2011 | Rao |
| 2012/0003728 | A1 | 1/2012 | Lanoue et al. |
| 2012/0109387 | A1 | 5/2012 | Martin et al. |
| 2012/0249741 | A1 | 10/2012 | Maciocci et al. |
| 2013/0006401 | A1* | 1/2013 | Shan .................. H05B 35/00 700/90 |
| 2013/0185108 | A1 | 7/2013 | Bainbridge et al. |
| 2013/0191836 | A1 | 7/2013 | Meyer |
| 2013/0235183 | A1 | 9/2013 | Redden |
| 2013/0332205 | A1 | 12/2013 | Friedberg et al. |
| 2014/0026474 | A1 | 1/2014 | Kulas |
| 2014/0035752 | A1* | 2/2014 | Johnson .................. A01B 79/005 340/601 |
| 2014/0115958 | A1 | 5/2014 | Helene et al. |
| 2014/0154729 | A1 | 6/2014 | Leyns et al. |
| 2014/0168412 | A1 | 6/2014 | Shulman et al. |
| 2014/0176688 | A1 | 6/2014 | Ibamoto |
| 2014/0200690 | A1 | 7/2014 | Kumar |
| 2014/0288850 | A1 | 9/2014 | Avigdor et al. |
| 2014/0324490 | A1 | 10/2014 | Gurin |
| 2015/0015697 | A1 | 1/2015 | Redden et al. |
| 2015/0026092 | A1 | 1/2015 | Abboud et al. |
| 2015/0120349 | A1 | 4/2015 | Weiss |
| 2015/0131867 | A1 | 5/2015 | Lin et al. |
| 2015/0185995 | A1 | 7/2015 | Shoemaker et al. |
| 2015/0227707 | A1 | 8/2015 | Laws et al. |
| 2015/0230409 | A1 | 8/2015 | Nicole et al. |
| 2015/0261803 | A1 | 9/2015 | Song et al. |
| 2015/0286897 | A1 | 10/2015 | Spaith |
| 2015/0295877 | A1 | 10/2015 | Roman |
| 2015/0356721 | A1 | 12/2015 | Li et al. |
| 2015/0370935 | A1* | 12/2015 | Starr .................. G06Q 50/02 703/11 |
| 2016/0026940 | A1 | 1/2016 | Johnson |
| 2016/0050840 | A1 | 2/2016 | Sauder et al. |
| 2016/0050862 | A1 | 2/2016 | Walliser |
| 2016/0086032 | A1* | 3/2016 | Pickett .................. G06T 1/0007 382/110 |
| 2016/0127599 | A1 | 5/2016 | Medicherla et al. |
| 2016/0140868 | A1 | 5/2016 | Lovett et al. |
| 2016/0148104 | A1 | 5/2016 | Itzhaky et al. |
| 2016/0205872 | A1 | 7/2016 | Chan et al. |
| 2016/0216245 | A1 | 7/2016 | Sutton |
| 2016/0239709 | A1 | 8/2016 | Shriver |
| 2016/0278300 | A1* | 9/2016 | Clendinning ............ A01G 9/20 |
| 2016/0302351 | A1* | 10/2016 | Schildroth ............ B64C 39/024 |
| 2016/0345517 | A1 | 12/2016 | Cohen et al. |
| 2017/0030877 | A1 | 2/2017 | Miresmailli et al. |
| 2017/0038749 | A1 | 2/2017 | Mewes et al. |
| 2017/0039657 | A1 | 2/2017 | Honda et al. |
| 2017/0064912 | A1 | 3/2017 | Tabakman |
| 2017/0068924 | A1 | 3/2017 | Tanaka et al. |
| 2017/0250751 | A1 | 8/2017 | Kargieman et al. |
| 2017/0286772 | A1 | 10/2017 | Workman et al. |
| 2017/0287082 | A1 | 10/2017 | Karube et al. |
| 2017/0300846 | A1 | 10/2017 | Harwood |
| 2017/0374323 | A1 | 12/2017 | Gornik |
| 2018/0014452 | A1* | 1/2018 | Starr .................. A01M 13/00 |
| 2018/0039261 | A1 | 2/2018 | Haller et al. |
| 2018/0041545 | A1 | 2/2018 | Chakra et al. |
| 2018/0052637 | A1 | 2/2018 | Chen |
| 2018/0082362 | A1 | 3/2018 | Greenberg et al. |
| 2018/0083844 | A1 | 3/2018 | Greenberg et al. |
| 2018/0108123 | A1 | 4/2018 | Baurer et al. |
| 2018/0276504 | A1 | 9/2018 | Yamaguchi et al. |
| 2018/0325051 | A1 | 11/2018 | Brandao et al. |
| 2019/0034736 | A1 | 1/2019 | Bisberg et al. |
| 2019/0212316 | A1 | 7/2019 | Sutton |
| 2019/0220964 | A1 | 7/2019 | Mello |
| 2019/0244428 | A1 | 8/2019 | Greenberg et al. |
| 2019/0284567 | A1 | 9/2019 | Reynolds et al. |
| 2020/0264759 | A1 | 8/2020 | Greenberg et al. |
| 2021/0304513 | A1 | 9/2021 | Greenberg et al. |
| 2021/0307259 | A1* | 10/2021 | Setlur .................. A01G 9/26 |
| 2022/0108403 | A1 | 4/2022 | Greenberg et al. |

FOREIGN PATENT DOCUMENTS

| | | |
|---|---|---|
| CA | 3089725 C | 6/2022 |
| EP | 2736318 A1 | 6/2014 |
| JP | 2011103870 A | 6/2011 |
| KR | 20130005540 A | 1/2013 |
| KR | 20140077513 A | 6/2014 |
| KR | 20140114089 A | 9/2014 |
| KR | 20150000435 A | 1/2015 |
| KR | 1020190004978 A | 1/2019 |
| WO | 2011115666 A2 | 9/2011 |
| WO | 2014100502 A1 | 6/2014 |
| WO | 2018057796 A1 | 3/2018 |

(56) References Cited

FOREIGN PATENT DOCUMENTS

| WO | 2018057799 A1 | 3/2018 |
|---|---|---|
| WO | 2019157107 A1 | 8/2019 |

OTHER PUBLICATIONS

Canadian Patent Application No. 3,089,725 Office Acton dated Aug. 18, 2021, 5 pages.
European Patent Application No. 17853932.6, Extended European Search Report dated Feb. 21, 2020, 12 pages.
European Patent Application No. 17853932.6, Office Action dated Dec. 16, 2021, 7 pages.
European Patent Application No. 17853934.2, Extended European Search Report dated Dec. 13, 2019, 10 pages.
European Patent Application No. 17853934.2, Office Action dated Dec. 9, 2021, 8 pages.
European Patent Application No. 17853934.2, Office Action dated Dec. 11, 2020, 7 pages.
International Application No. PCT/US2017/052800, International Search Report and Written Opinion dated Jan. 16, 2018, 14 pages.
International Application No. PCT/US2017/052805, International Search Report and Written Opinion dated Jan. 9, 2018, 14 pages.
International Application No. PCT/US2019/016927, International Search Report and Written Opinion dated May 7, 2019, 9 pages.
International Application No. PCT/US2021/023301, International Search Report and Written Opinion dated Jul. 12, 2021, 10 pages.
Jean Angeles et al. AR Plants: Herbal Plant Mobile Application utilizing Augmented Reality. Dec. 2017. [retrieved on Apr. 1, 2019]. Retrieved from the Internet:. entire document.
Markus Funk et al: "Interactive worker assistance" , Pervasive and Ubiquitous Computing, ACM, 2 Penn Plaza, Suite 701 New York NY 10121-0701 USA, Sep. 12, 2016 (Sep. 12, 2016), pp. 934-939, XP058279126, DOI:10.1145/2971648.2971706 ISBN: 978-1-4503-4461-6.
Nonami et al."Environmental Control for Plant Growth in Plant Factory Operation and Greenhouse Management From Physiological Viewpoint", IFAC Mathematical and Control Applications n Agriculture and Horticulture, pp. 125-130. (Year: 1991).
Qing Yao et al.: "Application of Support 1-15 Vector Machine for Detecting Rice Diseases Using Shape and Color Texture Features", Engineering Computation, 2009. ICEC 109. International Conference On, IEEE, Piscataway, NJ, USA, May 2, 2009 (May 2, 2009), pp. 79-83, XP031491490, ISBN: 978-0-7695-3655-2 * the whole document*.
S. Nagasai, et al., 'Plant Disease Identification using Segmentation Techniques', In: International Journal of Advanced Research in Computer and Communication Engineering, Oct. 5, 2015, vol. 4, Issue 9, ISSN (Online) 2278-1021 (https://www.ijarcce.com/upload/2015/september-15/?C=N;O=A) See abstract; and pp. 411-412.
Sagar Patil et al., "A Survey on Methods of Plant Disease Detection," International Journal of Science and Research (IJSR), 2015, vol. 4, Issue 2, ISSN (Online): 2319-7064.
Sannakki et al., "Comparison of Difference Leaf Edge Detection Algorithms Using Fuzzy Mathematical Morphology," International Journal of Innovations in Engineering and Technology (IJIET), vol. 1, Issue 2 (Aug. 2012), pp. 15-21.
Shah Jitesh P et al: "A survey on detection and classification of rice plant diseases", 2016 IEEE International Conference On Current Trends in Advanced Computing (ICCTAC), IEEE, Mar. 10, 2016 (Mar. 10, 2016), pp. 1-8, XP032960803, DOI: 10.1109/ICCTAC.2016.7567333 [retrieved on Sep. 13, 2016] *abstract* Sec.VII* * Sec. V * * figure.
U.S. Appl. No. 15/271,569, Final Office Action dated Apr. 24, 2018, 18 pages.
U.S. Appl. No. 15/271,569, Non-Final Office Action dated Jan. 23, 2018, 33 pages.
U.S. Appl. No. 15/271,569, Notice of Allowance, dated Mar. 11, 2019, 21 pages.
U.S. Appl. No. 15/271,630, Final Office Action dated Apr. 17, 2019, 11 pages.
U.S. Appl. No. 15/271,630, Non-Final Office Action dated Sep. 26, 2018, 18 pages.
U.S. Appl. No. 15/271,630, Notice of Allowance, dated Jan. 15, 2020, 18 pages.
U.S. Appl. No. 15/271,630, Notice of Allowance, dated Nov. 20, 2019, 22 pages.
U.S. Appl. No. 15/271,658, Final Office Action dated Jul. 29, 2019, 31 pages.
U.S. Appl. No. 15/271,658, Non Final Office Action dated Jan. 8, 2020, 36 pages.
U.S. Appl. No. 15/271,658, Non-Final Office Action dated Sep. 19, 2018, 8 pages.
U.S. Appl. No. 15/271,658, Notice of Allowance dated May 5, 2020, 47 pages.
U.S. Appl. No. 15/271,727, Final Office Action dated Nov. 2, 2020, 36 pages.
U.S. Appl. No. 15/271,727, Final Office Action dated Apr. 25, 2019, 36 pages.
U.S. Appl. No. 15/271,727, Non Final Office Action dated Feb. 4, 2020, 62 pages.
U.S. Appl. No. 15/271,727, Non-Final Office Action dated Oct. 2, 2018, 22 pages.
U.S. Appl. No. 15/271,727, Notice of Allowance dated Aug. 13, 2021, 130 pages.
U.S. Appl. No. 15/271,749, Final Office Action dated Mar. 16, 2020, 52 pages.
U.S. Appl. No. 15/271,749, Final Office Action dated Jun. 30, 2021, 86 pages.
U.S. Appl. No. 15/271,749, Non Final Office Action dated Oct. 16, 2019, 58 pages.
U.S. Appl. No. 15/271,749, Notice of Allowance dated Sep. 1, 2022, 739 pages.
U.S. Appl. No. 15/271,749, Notice of Allowance dated May 18, 2022, 417 pages.
U.S. Appl. No. 15/271,749, Notice of Allowance dated Mar. 23, 2022, 214 pages.
U.S. Appl. No. 15/271,749, Notice of Allowance dated Feb. 24, 2022, 139 pages.
U.S. Appl. No. 15/271,749, Office Action dated Sep. 11, 2020, 63 pages.
U.S. Appl. No. 15/891,110, Final Office Action dated May 1, 2020, 31 pages.
U.S. Appl. No. 15/891,110, Final Office Action dated Dec. 17, 2018, 13 pages.
U.S. Appl. No. 15/891,110, Non Final Office Action dated Oct. 24, 2019, 32 pages.
U.S. Appl. No. 15/891,110, Non-Final Office Action dated Jul. 13, 2018, 15 pages.
U.S. Appl. No. 15/891,110, Notice of Allowance dated Dec. 2, 2020, 17 pages.
U.S. Appl. No. 15/891,110, Notice of Allowance dated Feb. 18, 2021, 17 pages.
U.S. Appl. No. 15/891,110, Notice of Allowance dated Mar. 18, 2021, 16 pages.
U.S. Appl. No. 15/891,110, Office Action dated Aug. 26, 2020, 13 pages.
U.S. Appl. No. 16/830,111, Notice of Allowance dated Nov. 2, 2022, 47 pages.
U.S. Appl. No. 16/830,111, Notice of Allowance dated Jul. 13, 2022, 29 pages.
U.S. Appl. No. 16/830,111, Notice of Allowance dated Mar. 13, 2023, 25 pages.
U.S. Appl. No. 16/830,111, Office Action dated Jan. 18, 2022, 24 pages.
U.S. Appl. No. 16/859,891, Final Office Action dated Feb. 19, 2021, 32 pages.
U.S. Appl. No. 16/859,891, Final Office Action dated May 27, 2021, 24 pages.
U.S. Appl. No. 16/859,891, Notice of Allowance dated Dec. 29, 2021, 16 pages.

(56) References Cited

OTHER PUBLICATIONS

U.S. Appl. No. 16/859,891, Office Action dated Sep. 14, 2020, 40 pages.
U.S. Appl. No. 16/998,925, Notice of Allowance dated Apr. 5, 2022, 83 pages.
U.S. Appl. No. 16/998,925, Office Action dated Nov. 23, 2021, 100 pages.
U.S. Appl. No. 17/347,343, Office Action dated Aug. 2, 2022, 45 pages.
U.S. Appl. No. 17/347,343, Office Action dated Feb. 8, 2023, 24 pages.
U.S. Appl. No. 17/959,236 Office Action dated Jan. 27, 2023, 44 pages.
Vaglica, "Shrub Pruning Dos and Donts", Aug. 3, 2016, https://www.thisoldhouse.com/ideas/shrub-pruning-dos-and-donts (Year: 2016).
White "The Growing Business of Cover Crops", Aug. 2014, National Wild Life Federation, pp. 1-27 (Year: 2014).

\* cited by examiner

ONLINE DATA MARKET FOR AUTOMATED PLANT GROWTH INPUT CURVE SCRIPTS

CROSS-REFERENCE TO RELATED APPLICATION

This application is a divisional of U.S. application Ser. No. 15/271,749, filed Sep. 21, 2016, which is incorporated by reference.

BACKGROUND

In a competitive marketplace, merchants of plant growth systems are often required to go to great lengths to attract and retain consumer plant growers. Traditionally, merchants may rely on advertising and reputation to attract and retain consumers. More recently, merchants may offer special deals through advertising as a means of expanding their market share. However, as an unintended consequence, consumers may be inundated with a plethora of advertisements from multiple merchants. Consumer plant growers may become frustrated by the number of available options, and may choose to forgo the selection process. This may ultimately lead to lost sales revenue for competing merchants.

Presently, there is a need for a medium that allows merchants to target their advertisements towards consumer plant growers that have expressed a relevant need or interest in their plant growth systems. Further, there is also a need for a medium that allows consumer plant growers to access and solicit a network of merchants that address a consumer plant grower's general and/or specific plant growing needs or interests.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
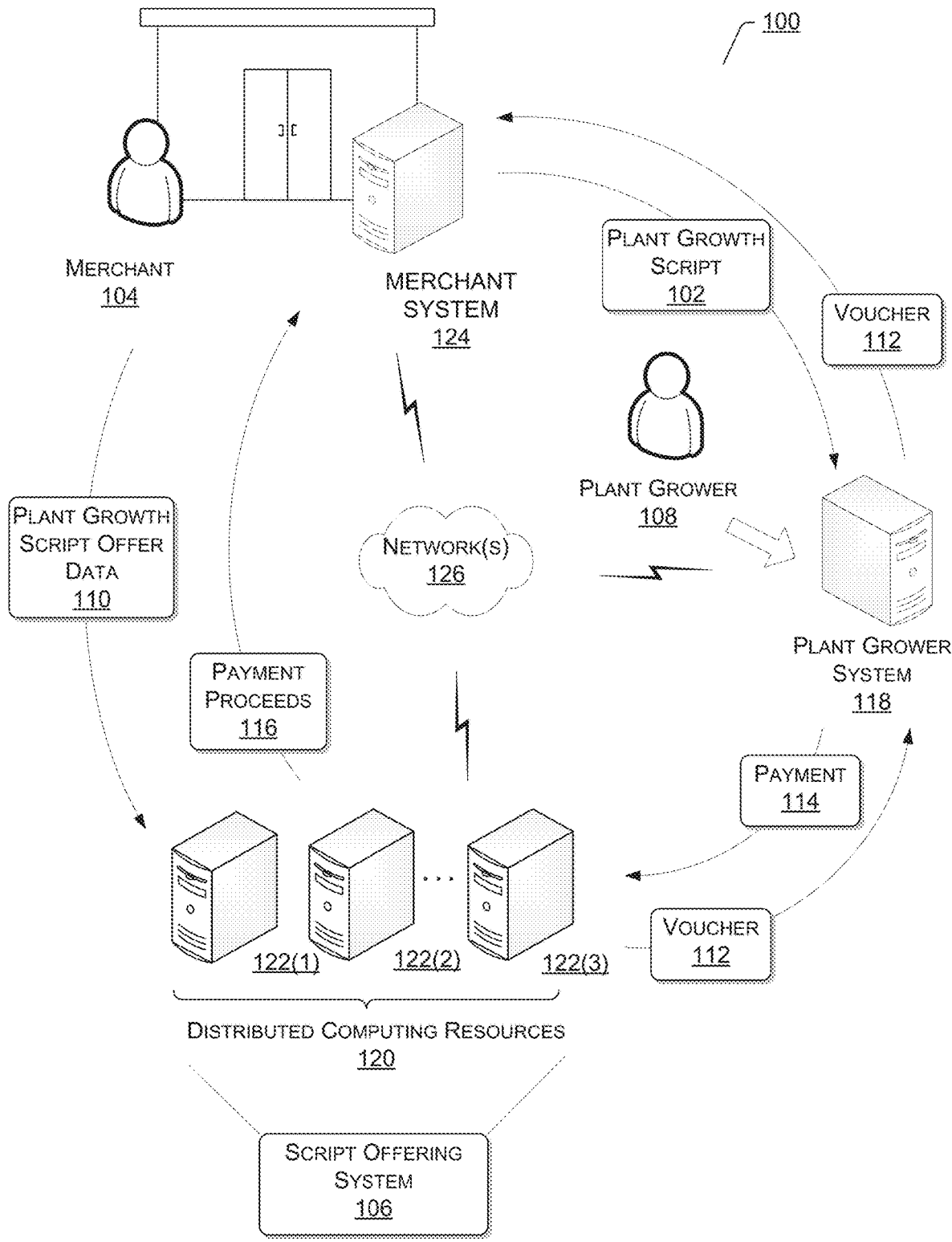
FIG. 1 illustrates a schematic view of an exemplary environment for the sale and exchange of automated plant growth scripts in an electronic marketplace.

This disclosure describes techniques that facilitate the sale and exchange of plant growth systems to consumer plant growers. Particularly, this disclosure describes a script offering system that may act as an intermediary medium that allows merchants to advertise plant growth scripts to consumer plant growers via an electronic marketplace. In some examples, the script offering system may allow merchants to advertise plant growth scripts to consumer plant growers that have expressed an interest or need for a particular type of plant growth script. In other examples, the script offering system may allow consumer plant growers to solicit merchants to bid for the sale of plant growth scripts. In some examples, a solicitation may include a description of specific needs or interests. Alternatively, or additionally, the solicitation may include sensor data from an existing plant growth operation that describes specific needs or interests.

The term "plant growth script" as used herein describes a computational algorithm that monitors a plant growth operation via one or more sensors. Sensor data from one or more sensors may include environmental data and image data that relates to a plant growth operation. In a non-limiting example, sensor data may include a measured light intensity, a light spectrum, a proportion of nutrients and fertilizers, an amount of nutrients and fertilizers, an amount of water, and a frequency of a watering operation. Other sensor data may include thermal radiation, color, and temperature measurements of individual plants. The plant growth scripts may also support conditional rules that trigger an event based on sensor data. For example, if sensor data indicates that light intensity is less than a predetermined threshold, the plant growth script may cause a change to the light intensity of lights within the plant growth operation. Further, conditional rules may trigger a compound event that is tied to Boolean logic. For example, if sensor data indicates than an amount of water dispensed over a predetermined period of time is less than a predetermined threshold, the plant growth script may cause an increase to the amount of water dispensed during each watering operation, as well as an increase to the frequency of the watering operation.

In various examples, a plant grower system may execute the plant growth scripts. The plant grower system may be communicatively coupled to a controller system of the plant growth operation. The controller system may capture sensor data from environmental sensor(s) and image capturing device(s) that monitor the plant growth operation, and transmit the sensor data to the plant grower system. The plant grower system may then execute a plant growth script, using the sensor data as an input, and determine plant grower action(s) that optimize plant growth. Plant grower action(s) may include changing a light intensity or light spectrum of existing lighting, changing an amount of water or a frequency of a watering operation, changing an amount of nutrients or fertilizer, or the ratio of nutrients to fertilizer used within a plant growth operation.

The plant grower system may transmit an indication of plant grower action(s) to the controller system. In some examples, the controller system may automate the performance of plant grower action(s) within a plant growth operation. Automated plant grower action(s) may include the operation and control of light intensity and light spectrum of an existing lighting system, or control of the amount of water and frequency of a watering operation.

The term "techniques," as used herein, may refer to system(s), method(s), computer-readable instructions, module(s), algorithms, hardware logic, and/or operation(s) as permitted by the context described above and throughout the disclosure.

FIG. 1 illustrates a schematic view of a computing environment 100 that depicts the sale and exchange of plant growth script(s) 102 in an electronic marketplace. The computing environment 100 may include merchant(s) 104 that offer plant growth script(s) 102 to plant grower(s) 106. The merchant(s) 104 may use a script offering system 108, as an intermediary medium, to present deals to plant grower(s) 106 via an electronic marketplace. The deals may include an offer to purchase or license plant growth script(s) 102 that monitor a plant growth operation. The plant growth script(s) 102 may determine one or more plant grower action(s) that may optimize plant growth. The deals may offer a voucher 112 that may be redeemed for restricted or unrestricted access to the plant growth script(s) 102. Restricted access may be based on a predetermined period of time, or the duration of one or more plant life cycle(s).

In the illustrated example, merchant(s) 104 may transmit offer data 110 that is associated with plant growth script(s) 102 to the script offering system 108. The offer data 110 may include a description of the plant growth script(s) 102 that includes the type of plants that the plant growth script(s) 102 intend to support, and the types of plant grower actions that the plant growth script may use to optimize plant growth. Types of plant grower actions may include controlling light intensity, light spectrum, an amount of water, and the frequency of a watering operation. The offer data 110 may also include a price for restricted and/or unrestricted access to the plant growth script(s) 102, and conditions that govern the use of the plant growth script(s) 102. Conditions may include licensing agreement terms, a period of validity, and an availability of technical product support.

In the illustrated example, the script offering system 108 may present a deal that offers the plant growth script(s) 102 to plant grower(s) 106 via the electronic market place. In one example, the deal may be presented to all plant grower(s) 106 within the electronic market place. In another example, plant grower(s) 106 may be able to search for the deal using an identifiably descriptive term. Further, plant grower(s) 106 may be able to search for the deal by specifying a price range, licensing terms, a type of plant grower actions that the plant growth script(s) 102 should accommodate, or the type of plants that the plant growth script(s) 102 should support. In some examples, rather than offering the deal for plant growth script(s) 102 to all plant grower(s) 106, the script offering system 108 may present the deal to a subset of plant grower(s) 106 based on consumer profile data. The consumer profile data may be stored within the script offering system 108 and include demographic data, a purchase history, or a history of online activity.

In the illustrated example, plant grower(s) 106 that purchase a deal for plant growth script(s) 102 may be able to obtain a voucher 112 from the script offering system 108. The voucher 112 may be redeemable by the merchant(s) 104 in exchange for the plant growth script(s) 102 specified in the deal. The voucher 112 may be an electronic voucher or a tangible voucher. The script offering system 108 may accept a payment 114 from the plant grower(s) 106 in exchange for the voucher 112. In doing so, the script offering system 108 may transmit payment proceeds 116 to the merchant(s) 104 upon sale of the deal to the plant grower(s) 106. In some examples, the payment proceeds 116 may comprise the value of the deal less a commission retained by the script offering system 108 as consideration for fulfillment of the sale. The commission may be a fixed value, a predetermined percentage of the deal value, or a combination of both.

In the illustrated example, the plant grower(s) 106 may present the voucher 112 obtained from the script offering system 108 to the merchant(s) 104 for redemption. The merchant(s) 104, may verify an authenticity and validity of the voucher 112 and in doing so, transmit a copy of the plant growth script(s) 102 specified in the voucher 112, to a plant grower system 118 associated with the plant grower(s) 106. In some examples, the plant grower(s) 106 may present the voucher 112 at a physical location associated with the merchant(s) 104. In other examples, the plant grower(s) 106 may electronically transmit the voucher 112 to the merchant(s) 104. For example, the plant grower(s) 106 may use a plant grower system 118 to communicate with the script offering system 108 and the merchant system 120 via the one or more network(s) 126. Similarly, the merchant(s) 104 may use the merchant system 120 to communicate with the script offering system 108 and the plant grower system 118. The plant grower system 118 and the merchant system 120 may be any sort of electronic device, such as a cellular phone, a smart phone, a tablet computer, an electronic reader, a media player, a gaming device, a personal computer (PC), a laptop computer, etc. Further, the one or more network(s) 126 may include public networks such as the Internet, private networks such as an institutional and/or personal intranet, or some combination of private and public networks. The one or more network(s) 126 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof.

In the illustrated example, the script offering system 108 may operate on one or more distributed computing resource(s) 122. The one or more distributed computing resource(s) 122 may include one or more computing device(s) 124 that operate in a cluster or other configuration to share resource, balance load, increase performance, provide fail-over support or redundancy, or for other purposes. Further, the one or more computing device(s) 124 may include one or more interfaces that enable communications with electronic device(s), such as the plant grower system 118 and merchant system 120, via one or more network(s) 126.

Figure 2:
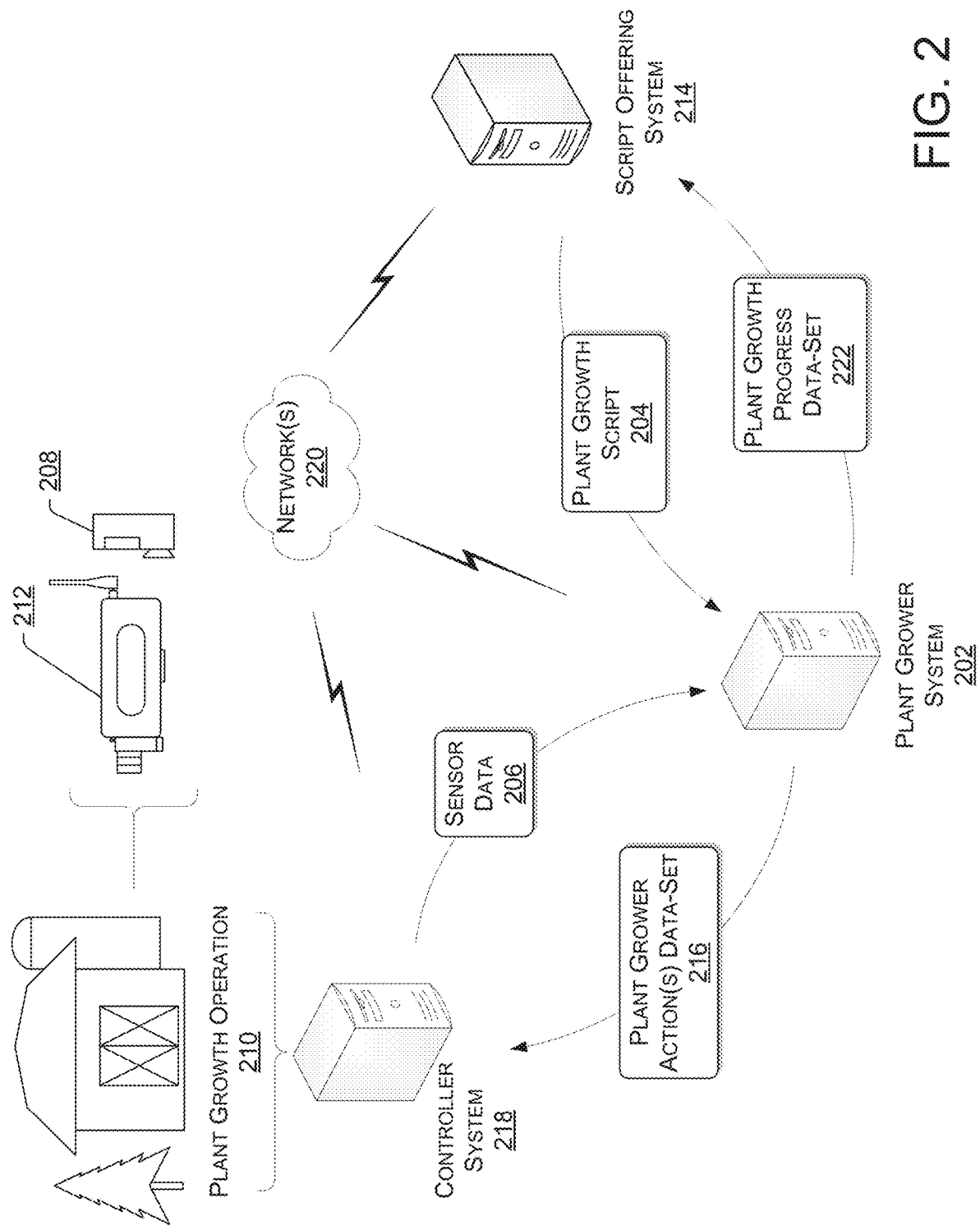
FIG. 2 illustrates a schematic view of an exemplary environment that describes a plant grower device that interacts with a plant growth operation controller to execute one or more automated plant grower actions.

FIG. 2 illustrates a schematic view of an exemplary environment of a plant grower system 202 that executes a plant growth script 204. The plant grower system 202 may correspond to plant grower system 118. The plant grower system 202 may receive sensor data 206 from environmental sensor(s) 208 that monitor individual plants within a plant growth operation 210. The sensor data 206 may include environmental data and image data. In some examples, the environmental data may be temporally correlated, that is synchronized, with the image data. Environmental sensor(s) 208 may capture environmental data associated with an individual plant or a batch of plants. The environmental data may relate to a measured light intensity, light spectrum, a proportion of nutrients and fertilizers, an amount of nutrients and fertilizers, an amount of water, a frequency of a watering operation, thermal radiation, color, and temperature. Environmental sensor(s) 208 may also monitor conditions that surround an individual plant and that apply to a batch of plants, generally. For example, a measurement of carbon dioxide intake or a measurement of oxygen production may be used to determine a rate of photosynthesis. Environmental sensor(s) 208 may include, but are not limited to, range-finding sensors, light intensity sensors, light spectrum sensors, non-contact infra-red temperature sensors, thermal sensors, photoelectric sensors that detect changes in color, carbon dioxide uptake sensors, and oxygen production sensors.

The plant grower system 202 may also include image capturing device(s) 212 that capture visual and hyperspectral images of an individual plant, a grouping of plants, or a batch of plants. In some examples, the image capturing device(s) 212 may have a field of vision that focuses on an individual plant, a group of individual plants, or a batch of plants. In some examples, the image capturing device(s) 212 may capture images of a single object, such as a plant, from at least two different locations, thereby creating at least two different lines of sight to points on the object. The lines of sight may be further processed via a stereoscopic analysis or structured light analysis to develop a three-dimensional model of the plant.

The image capturing device(s) 212 may continuously capture visual and hyperspectral images of a plant, or batches of plants. Image capturing device(s) 212 may employ a time-lapse technique whereby the frequency at which image frames are captured is lower than that used to view the sequence. For example, an image of a plant may be captured once every hour, then played back at 24 frames per second. The result is an apparent sequence of images that represent a 24-hour day being presented in one second. Additionally, or alternatively, the image capturing device(s) 212 may capture visual and hyperspectral images of a plant or batches of plants based on a triggering event. In a non-limiting example, a triggering event may be based on a change in the relative position of an individual plant with its surroundings. In some instances, the change in relative position may be based on an analysis of temporally sequential image data. In other instances, the change in relative position may be based on motion detected by one or more motion sensors associated with the image capturing device(s) 212. In another non-limiting example, a triggering event may include an indication that an environmental data-point has fallen below a predetermined threshold. For example, a triggering event may be determined by environmental data indicating that the production of oxygen has fallen below a threshold amount. Additionally, or alternatively, a triggering event may be based on probability clustering of environmental data that relates to individual plants, or batches of plants. For example, environmental data, and/or image data, may indicate a change in color of a single leaf of an individual plant. In doing so, the change in color of a single leaf may not be determined to be a triggering event. However, if the environmental data, and/or image data, indicates a presence of clusters of leaves with similar color changes, the clustering of color change may be determined to be a triggering event.

The environmental sensor(s) 208 and the image capturing device(s) 212 may be fixed installations within the plant growth operation 210. In another example, the environmental sensor(s) 208 and the image capturing device(s) 212 may be drone mounted to monitor the plant growth operation 210.

In the illustrated example, the plant grower system 202 may receive the plant growth script 204 from a script offering system 214. The script offering system 214 may correspond to the script offering system 108. Further, the plant grower system 202 may use the sensor data 206 received from the plant growth operation 210 to determine plant grower action(s) that may optimize plant growth. Plant grower action(s) may include changing a light intensity or light spectrum of existing lighting within a plant growth operation, changing an amount of water or a frequency of a watering operation, changing an amount of nutrients or fertilizer, or the ratio of nutrients to fertilizer used within a plant growth operation. A plant grower action(s) data-set 216 may be generated and transmitted to a controller system 218 of the plant growth operation 210. In some examples, the controller system 218 may be configured to automatically implement the plant grower action(s) received from the plant grower system 202. In other examples, the controller system 218 may generate and send one or more alerts to an operator of the plant growth operation 210. The one or more alerts may include a listing of the plant grower action(s) with a tentative execution schedule. The controller system 218 may operate on one or more computing device(s) that include one or more interfaces that enable communications with other electronic device(s) via one or more network(s) 220. The one or more network(s) 220 may correspond to the one or more network(s) 126.

In the illustrated example, the plant grower system 202 may analysis the sensor data 206 and determine that plant growth progress is less than optimal, meaning that plant growth is progressing at a rate that is less than a predetermined threshold rate. In doing so, the plant grower system 202 may generate and transmit a plant growth progress dataset 222 to the script offering system 214 to solicit merchants to offer plant growth script 204 that may address the less than optimal plant growth.

Figure 3:
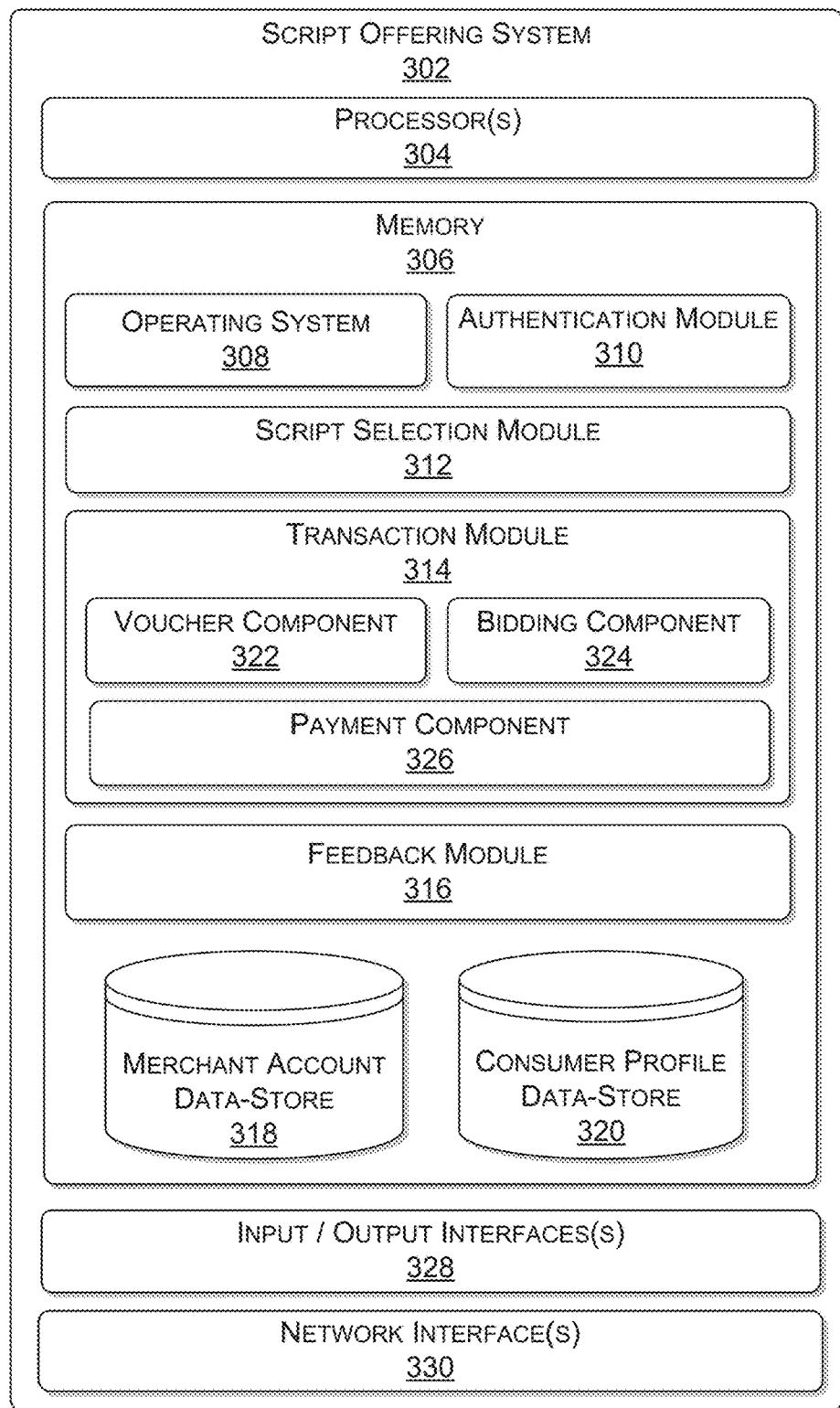
FIG. 3 illustrates a block diagram of a script offering system that facilitates an interaction between a merchant that deals with plant growth scripts and a consumer plant grower.

FIG. 3 illustrates a block diagram of a script offering system 302 that facilitates an interaction between a merchant that deals with plant growth scripts and a consumer plant grower. The script offering system 302 may present deals for plant growth scripts to consumer plant growers within an electronic marketplace. The deals may include an offer to purchase or license plant growth script(s) that monitor a plant growth operation and determine one or more plant grower actions that may optimize plant growth.

In the illustrated example, the script offering system 302 may include one or more processor(s) 304 that are operably connected to memory 306. In at least one example, the one or more processor(s) 304 may be one or more central processing unit(s) (CPU), graphics processing unit(s) (GPU), both a CPU and GPU, or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 304 may also be responsible for executing all computer applications stored in the memory, which can be associated with common types of volatile (RAM) and/or nonvolatile (ROM) memory.

In some examples, memory 306 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 306 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 306 may include an operating system 308, an authentication module 310, a script selection module 312, a transaction module 314, feedback module 316, a merchant account data-store 318, and a consumer profile data-store 320. The operating system 308 may be any operating system capable of managing computer hardware and software resources.

In the illustrated example, the authentication module 310 may be configured to authenticate a merchant or consumer that accesses the electronic marketplace associated with the script offering system 302. Authentication may be based on a device identifier used by the merchant or consumer when accessing the electronic marketplace. Alternatively, or additionally, authentication may be based on entry of a username and password, or a biometric identifier.

In the illustrated example, the script selection module 312 may select plant growth to advertise via the electronic marketplace. The selection may be based on advertising terms agreed upon with respective merchants. For example, merchants may offer payment for advertising plant growth scripts to a particular number of consumers or at particular times of the day. In other examples, the selection may be based on relative bid amounts offered by merchants to advertise through the electronic marketplace. The processing of one or more merchant bids is discussed in further detail below. Alternatively, or additionally, the selection may be consumer-specific. For example, once a consumer has been authenticated via the authentication module 310, the script selection module 312 may access profile data associated with the consumer and in doing so, select plant growth scripts that may align with known interests or consumer history. In a non-limiting example, the script selection module 312 may select a plant growth script for tomatoes for a consumer with a history or interest in growing tomatoes. In other examples, the script selection module 312 may select plant growth scripts based on factors such as past purchase behavior, a geographic location of the plant grower, and environmental factors that relate to a plant grower's plant growth operation. Further, the script selection module 312 may select plant growth scripts based on characteristics of the merchant offering the plant growth script. These characteristics may include past purchase satisfaction ratings, or satisfaction ratings associated with the plant growth scripts themselves. Characteristics may also include correlated similarities between a merchant profile and a consumer plant grower profile, such as a common geographic location.

In some instances, the script selection module 312 may also select plant growth scripts based on data uploaded by a particular plant grower. For example, a particular plant grower may be experiencing less than optimal plant growth. As result, the plant grower may upload data that underscores the progress of the plant growth operation. In doing so, the script selection module 312 may transmit the data to one or more merchants for the purpose of soliciting plant growth scripts that may help rectify the plant grower's less than optimal plant growth. The script selection module 312 may then select one or more plant growth scripts offered by the solicited merchants for advertisement to the particular plant grower, through the electronic marketplace.

In the illustrated example, the transaction module 314 may process payments for a plant growth script that is purchased through the electronic marketplace. The transaction module 314 may receive payments from financial accounts associated with consumer plant growers, and transfer payment proceeds to financial accounts associated with merchants. Further, the transaction module 314 may generate vouchers that can be redeemed by a merchant for a plant growth script. The transaction module 314 may include a voucher component 322, a bidding component 324, and a payment component 326.

The voucher component 322 may store redeemable vouchers for plant growth scripts purchased through the electronic marketplace. A redeemable voucher may include information such as a voucher identifier, a description of the plant growth script that is the subject of the voucher, terms and conditions for redemption of the voucher, and other pertinent information. A voucher identifier may be in the form of numbers, letters, symbols, or any combination thereof. Further, a voucher identifier may be an image, sound, or other piece of communicable media recognized by the merchant or service provider that is authenticating or validating the voucher. In a non-limiting example, a voucher may be generated by the voucher component 322 based on information received from a merchant. In this instance, a copy of the voucher may be transmitted to the merchant system for the purpose of verifying an authenticity of the voucher at a time of redemption. In another non-limiting example, a voucher may be generated by the merchant and sent to the voucher component 322 of the script offering system 302. In this example, the voucher may be issued to consumer plant growers at a time of sale, and an authenticity of the voucher may be verified by the originating merchant at a time of redemption.

The bidding component 324 may receive and process one or more bids from merchants to advertise plant growth scripts through the electronic marketplace. A bid may include a bid amount and conditions associated with fulfillment of a transaction for a plant growth script. The bidding component 324 may structure a bidding system according to any known system or otherwise. For example, a bid amount may correspond to financial remuneration that a merchant is willing to accept as consideration for sale of a plant growth script. The bidding component 324 may automatically select a winning bid based on a most favorable bid amount. That is, lowest cost to the plant grower. In a non-limiting example, a bidding arrangement may include a submission of a bid with a nominal bid amount, a minimum bid amount, and a condition whereby the nominal bid amount decreases to a bid amount lower than the next lowest bid amount, up to the minimum bid amount. In some examples, the criteria for selecting a winning bid may be based on consumer input that is sourced from the consumer profile data-store 320. For example, a winning bid may be selected based on preferred characteristics such as feedback star-rating, favorable redemption conditions and an availability of technical support.

The payment component 326 may receive payments from financial accounts associated with consumer plant growers, and transfer payment proceeds to financial accounts associated with merchants. The payment component 326 may accept many different payment types including electronic payment types (EPT) (e.g., credit cards, debit cards, stored value cards, etc.) and/or other payment types (e.g., cash, personal checks, money orders, etc.) in exchange for the voucher.

In the illustrated example, the feedback module 316 may allow consumers to provide feedback. Feedback may include a rating, comment, or review of a plant growth script. The feedback module 316 may prompt a consumer to provide feedback about a plant growth script, a point in time after the consumer has redeemed the voucher associated with the plant growth script. The feedback module 316 may also present special offers to incentivize the consumer to provide feedback.

In some examples, the consumer may provide a rating for a plant growth script. The feedback module 316 may aggregate the rating provided by the consumer with other ratings provided by other consumers for the same plant growth script. Thus, when a different consumer requests to view a description of the plant growth script, the script offering system 302 may present a description of the plant growth script along with the aggregated rating. Further, the feedback module 316 may also compare an aggregated rating provided by consumers for a particular plant growth script, with an aggregated rating of a same genre of plant growth scripts that are offered by multiple merchants. For example, a consumer may search for a plant growth script for growing mangoes. In doing so, the script selection module 312 may present a particular plant growth script with a three out of five-star rating that is offered by merchant 'A'. The script selection module 312 may also present a general two-star rating for mango plant growth scripts that are offered by merchants A, B, C, D, and E. In other words, even though a three-star rating for a mango plant growth script may appear mediocre on a five-star scale, the rating can be perceived as above average when compared to the two-star rating that is based on aggregated offerings of merchants A, B, C, D, and E.

In the illustrated example, the merchant account data-store 318 may include various types of identifying information of one or more merchants that offer plant growth scripts on the electronic marketplace. In a non-limiting example, the identifying information may include a name of the merchant, an identifier number or code associated with a merchant, an address of a merchant, and a location of a merchant. In some examples, the merchant account record may also include satisfaction ratings and feedback associated with previous sales or licenses made to consumer plant growers. Further, the merchant account record may also include financial account information associated with the merchant. The financial account information may include account numbers, routing numbers, passwords or electronic communication protocols that are required to access the financial account. The financial account may be the target or end point for payment proceeds from a consumer to the merchant.

In the illustrated example, the consumer profile data-store 320 may include various types of identifying information of consumers that search for plant growth scripts via the electronic marketplace. The consumer profile data-store 320 may develop a consumer profile for plant growers based on plant growth script purchase history, plant grower online activity detected within the plant growth marketplace. The purchase history may include purchase information for one or more purchase transactions, such as an identity of the plant grower, identity data associated with the merchant, description of each item, a quantity of each item purchases, and a price paid for each item purchased. Consumer activity may include information on other actions of the plant grower with each of the one or more merchants, the service provider, or any combination thereof. The consumer activity may include information relating to a search history of the consumer within the electronic marketplace, one or more advertisement click-through histories of the consumer, information on one or more item reviews, one or more item ratings, one or more item recommendations, or other online activities that may be attributed to the consumer.

In the illustrated example, the script offering system 302 may further include input/output interface(s) 328. The input/output interface(s) 328 may include any type of output interface known in the art, such as a display (e.g., a liquid crystal display), speakers, a vibrating mechanism, or a tactile feedback mechanism. Input/output interface(s) 328 also include ports for one or more peripheral devices, such as headphones, peripheral speakers, or a peripheral display. Further, the input/output interface(s) 328 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the script offering system 302 may include one or more network interface(s) 330. The one or more network interface(s) 330 may include any sort of transceiver known in the art. For example, the one or more network interface(s) 330 may include a radio transceiver that performs the function of transmitting and receiving radio frequency communications via an antenna. In addition, the one or more network interface(s) 330 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 330 may include wired communication components, such as an Ethernet port or a Universal Serial Bus (USB).

Figure 4:
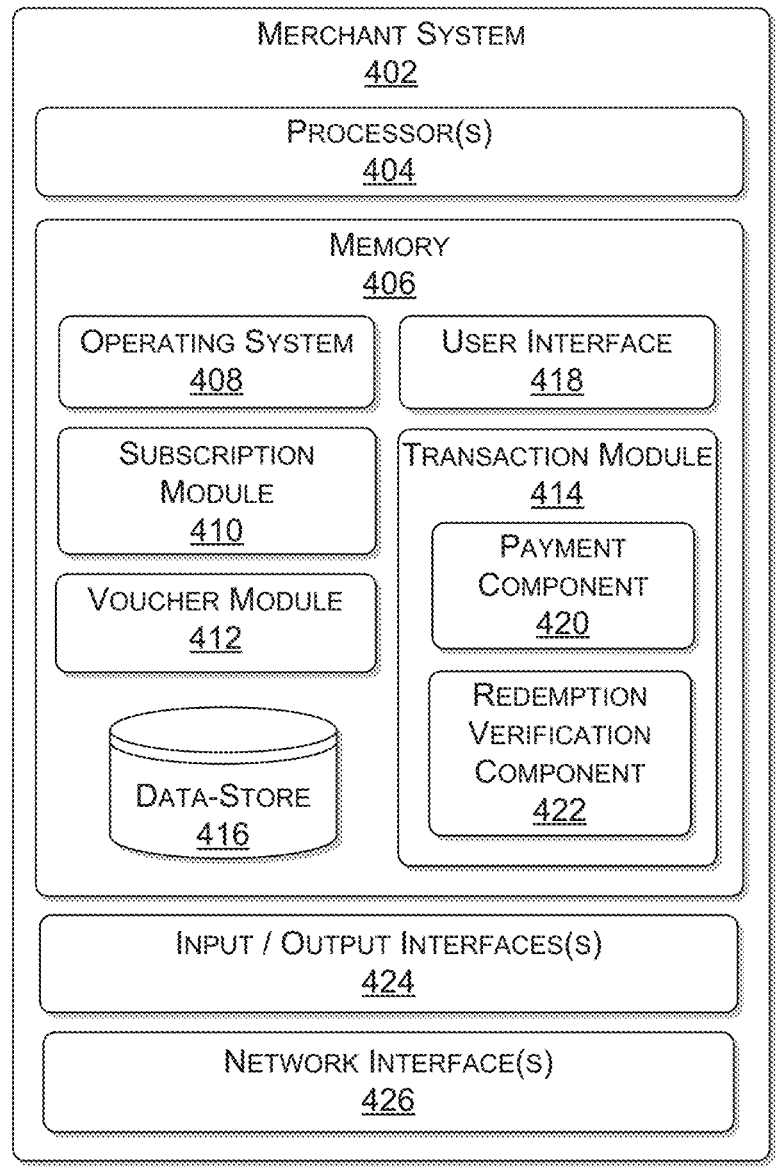
FIG. 4 illustrates a block diagram of a merchant system associated with a merchant that offers plant growth scripts to consumer plant growers.

FIG. 4 illustrates a block diagram of a merchant system 402 associated with a merchant that offers plant growth scripts to consumer plant growers. The merchant system 402 may correspond to merchant system 120. In the illustrated example, the merchant system 402 may include one or more processor(s) 404 operably connected to memory 406. The one or more processor(s) 404 may correspond to the one or more processor(s) 304, and the memory 406 may correspond to the memory 306.

In the illustrated example, the memory 406 may include an operating system 408, a subscription module 410, a voucher module 412, a transaction module 414, a data-store 416, and a user interface 418. The operating system 408 may be any operating system capable of managing computer hardware and software resources.

In the illustrated example, the subscription module 410 may manage subscriptions of plant growth scripts associated with plant growers that choose to license rather than purchase plant growth scripts. The subscription module 410 may limit plant grower systems' access to plant growth scripts based on terms of respective licensing agreements. In some instances, access may be limited to a predetermined time interval, or one or more plant life cycles. In some instances, the subscription module 410 may transmit notifications that alert plant grower systems that a subscription period is to expire.

Further, the subscription module 410 may cause script updates to be transmitted to plant grower systems based on terms of respective licensing agreements. In some examples, script updates may be dynamically sent to plant grower systems, soon after the plant growth scripts become available to a merchant. In other examples, script updates may be selectively transferred to plant grower systems based on the plant grower system's percentage completion of the previous version of the plant growth script. The subscription module 410 may solicit an indication from a plant grower system that clarifies a percentage completion of the previous version of plant growth script. Upon receiving a response from the plant grower system, and upon determining that the percentage completion is less than a predetermined percentage threshold, the subscription module 410 may transmit the script update to the plant grower system. In other words, if a plant grower has completed a significant portion of a plant growth script, a script update may cause harm to the plant growth operation. Thus, in some cases, it may be in the best interest of the plant grower for the subscription module 410 to withhold script updates until the plant life cycle is complete.

In the illustrated example, the voucher module 412 may generate redeemable vouchers that can be exchanged for access to plant growth scripts. The vouchers may be sent to the script offering system 302 for issuance to consumer plant growers at a time of sale through the electronic marketplace. The vouchers may include information such as a voucher identifier, a description of the plant growth script that is the subject of the voucher, terms and conditions of redemption of the voucher, and other pertinent information. A voucher identifier may be in the form of numbers, letters, symbols, or any combination thereof. Further, a voucher identifier may be an image, sound, or other piece of communicable media recognized by the merchant or service provider that is authenticating or validating the voucher. In an alternative embodiment, the voucher module 412 may receive vouchers generated by a voucher component 322 of the script offering system 302. This allows a merchant to verify an authenticity of a voucher generated by the script offering system 302 at a time of redemption by the consumer plant grower.

In the illustrated example, the transaction module 414 may verify transactions implemented by the script offering system with consumer plant growers, on behalf of the merchant. The transaction module 414 may include a payment component 420, and a redemption verification component 422. The payment component 420 may receive an indication that payment proceeds from the script offering system 302 have been transferred to a merchant in relation to the sale or licensing of a plant growth script. In some examples, the payment component 420 may receive an indication that payment proceeds have been transferred to a financial account associated with the merchant. In other examples, the payment component 420 may receive an indication that payment has been sent to the merchant in the form of cash, personal check money order as consideration for the sale or licensing of the plant growth script.

The redemption verification component 422 may verify an authenticity of a request to redeem a voucher. In some examples, the redemption verification component 422 may determine that a redemption request is valid when a voucher identifier associated with a voucher issued by the script offering system, match designated confirmation credentials associated with the redemption of that same voucher. In at least one example, the redemption request may also need to meet one or more additional criteria in order to be considered valid. For example, the redemption verification component 422 may verify that the voucher has not been previously redeemed, and that the voucher has not expired. In some examples, verification data used to verify an authenticity of a voucher may include text, a picture, a sound, a video, or a haptic response, any of which may be required as part of a redemption process.

In the illustrated example, the data-store 416 may store a record of redeemable vouchers generated by the voucher module 412, or received from the script offering system 302. The record may include information such as a voucher identifier, a description of the plant growth script that is the subject of the voucher, terms and conditions for redemption of the voucher, and other pertinent information. Further, the data-store 416 may also store the plant growth scripts that are marketed via the electronic marketplace, for issuance to consumer plant growers.

In the illustrated example, the user interface 418 may be presented on a display device that interfaces with the merchant system 402 via the input/output interface(s) 424. The user interface 418 may present a merchant to receive alerts sent from the script offering system 302. The alerts may include a notification of a sale of a voucher associated with a plant growth script, and/or a request or receipt of voucher information. Further, the user interface 418 may provide a merchant with an option to generate a voucher, and transmit the voucher to the script offering system for issuance to consumer plant growers. Further, the user interface 418 may also allow a merchant to generate a bid to advertise one or more plant growth scripts via the electronic marketplace.

In the illustrated example, the merchant system 402 may include input/output interface(s) 424 and network interface(s) 426. The input/output interface(s) 424 and the network interface(s) 426 may correspond to the input/output interface(s) 328 and the network interface(s) 330 respectively.

Figure 5:
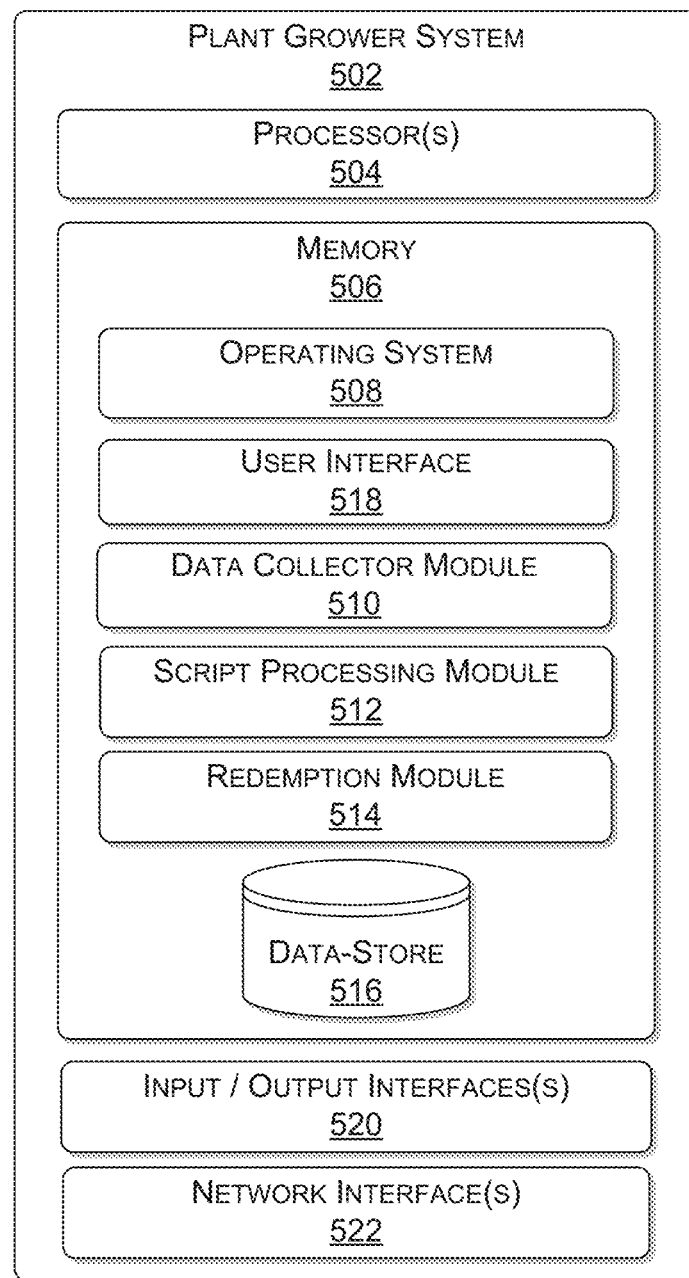
FIG. 5 illustrates a block diagram of plant grower system that may execute a plant growth script using sensor data received from a plant growth operation as inputs.

FIG. 5 illustrates a block diagram of a plant grower system 502 that may execute a plant growth script using sensor data received from a plant growth operation as inputs. In doing so, the plant grower system 502 may determine one or more plant grower actions that optimize plant growth of associated with the plant growth operation. The plant grower system 502 may correspond to plant grower system 118 and 202. In the illustrated example, the plant grower system 502 may include one or more processor(s) 504 operably connected to memory 506. The one or more processor(s) 504 may correspond to the one or more processor(s) 304 and 404, and the memory 506 may correspond to the memory 306 and 406.

In the illustrated example, the memory 506 may include an operating system 508, a data collector module 510, a script processing module 512, a redemption module 514, a data-store 516, and a user interface 518. The operating system 508 may be any operating system capable of managing computer hardware and software resources.

In the illustrated example, the data collector module 510 may aggregate the sensor data received from the plant growth operation to generate inputs for the plant growth script. The sensor data may include a measured light intensity, a light spectrum, a portion of nutrients and fertilizers, an amount of nutrients and fertilizers, an amount of water, and a frequency of a watering operation. Other sensor data may include thermal radiation, color, and temperature measurements of individual plants.

In the illustrated example, the script processing module 512 may execute the plant growth script using, as inputs, the processed data from the data collector module 510. In some examples, the script processing module 512 may determine a progress metric based at least in part on the sensor data. The progress metric may quantify progress of plant growth within the plant growth operation relative to milestones predicted by the plant growth script. The progress metric may be represented as an integer on a predetermined scale that reflects optimal growth as a medium point on the scale, less than optimal growth on a numerically low point on the scale, and advanced growth on a numerically high point on the scale. In other examples, the progress metric may be represented as a color chart, that varies in tone and shade between red and green to reflect less than optimal growth and more than optimal growth, respectively.

In a non-limiting example, sensor data may indicate that at a particular point in time during the plant life cycle, one or more plant(s) within the plant growth operation are at an early stage of development based on their size, shape, or color. At the same time, the plant growth script may determine that the one or more plant(s) should have reached a particular milestone that reflects a more advanced stage of development, based on an expected threshold size, shape, or color. Accordingly, the plant growth script may quantify a progress metric that reflects less than optimal growth and further transmit an alert to a plant grower indicating the same. Alternatively, if sensor data indicates that plant growth has timely reached an expected milestone, the script processing module 512 may quantify a progress metric that reflects the same, and also transmit an alert that notifies the plant grower that one or more plant(s) have timely reached an expected milestone. The alert may further indicate that plant growth progress is at an optimal level.

In the illustrated example, the redemption module 514 may manage the redemption of vouchers for plant growth scripts purchased or licensed by a plant grower. In one non-limiting example, the redemption module 514 may cause a voucher to be displayed by the plant grower system 502 for a predetermined amount of time, after which the voucher may expire. The merchant may verify an authenticity and validity of the voucher by viewing displayed voucher. In an alternative embodiment, the redemption module 514 may transmit the voucher electronically to the merchant. In doing so, the merchant may verify an authenticity and validity of the voucher, and then send to the plant grower system 502, the plant growth script that is the subject of the voucher.

In the illustrated example, the data-store 516 may store acquired vouchers for plant growth scripts acquired via the electronic marketplace. The acquired vouchers may be retained within the data-store 516 while they remain valid. That is, the acquired vouchers may remain within the data-store 516 until they expire, or until they are redeemed by a merchant. Further, the data-store 516 may store data relating to the plant growth scripts received from merchants. The data may include plant growth script execution files and result files. In some examples, the plant growth script execution files may be stored indefinitely within the data-store 516. In other examples, the plant growth script execution files may be stored for a predetermined period of time that is governed by an access licensing agreement between the merchant and the plant grower.

In the illustrated example, the user interface 518 may be configured to display notifications that alert consumer plant growers of the progress of a plant growth operation with respect to an expected stage of plant growth based on the plant growth script. In some examples, the alert may indicate that the progress observed by one or more sensors of the plant growth operation may be less than expected based on the plant growth script. Alternatively, the alert may indicate that plant growth associated with the plant growth operation is at an expected stage or an advanced stage of completion. In various examples, the user interface 518 may provide a means for a plant grower to upload a results file generated by the plant growth script to the script offering system. The purpose of doing so allows a plant grower to solicit plant growth scripts from merchants, based on data associated with a plant growth operation. Additionally, or alternatively, the results file may also include a comparison of plant growth progress relative to the stage of completion of the plant growth script. In some examples, the user interface 518 may also provide a means for a plant grower to request and select bids for plant growth scripts from merchants via the script offering system. The user interface 518 may also allow plant growers to specify underlying conditions that solicited bids must meet. In a non-limiting example, the underlying conditions may include a preferred licensing duration, a minimum satisfaction rating of a plant growth script or merchant, or a request for a plant growth script for a particular plant species.

In the illustrated example, the plant grower system 502 may include input/output interface(s) 520 and network interface(s) 522. The input/output interface(s) 520 and the network interface(s) 522 may correspond to the input/output interface(s) 328 and 424, and the network interface(s) 330 and 426 respectively.

Figure 6:
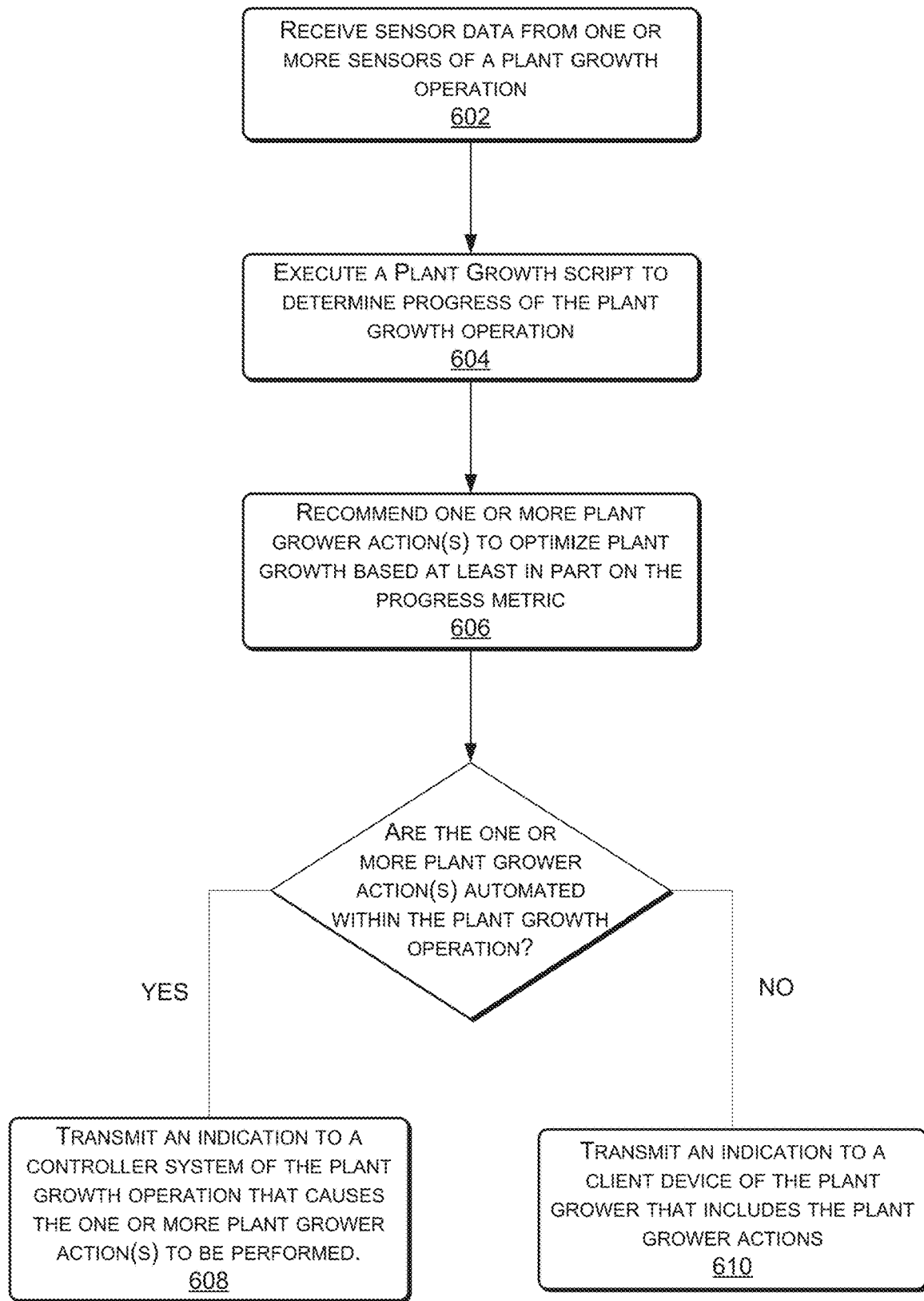
FIG. 6 illustrates a flow diagram for a process that describes a plant grower system executing a plant growth script using sensor data received from a plant growth operation.

FIG. 6 illustrates a flow diagram for a process that describes a plant grower system executing a plant growth script using sensor data received from a plant growth operation. The plant growth script may be used to determine one or more plant grower actions that optimize plant growth of a plant growth operation. At 602, the plant grower system may receive sensor data from one or more sensors of a plant growth operation. The one or more sensors may include image capturing devices and environmental sensors. The environmental sensors may include, but are not limited to, non-contact infra-red temperature sensors, thermal sensors, photoelectric sensors that detect changes in color, carbon dioxide uptake sensors, and oxygen production sensors.

At 604, the plant grower system may execute a plant growth script to determine plant growth progress of the plant growth operation. The plant growth script may use sensor data as an input to quantify a progress metric that quantifies progress of plant growth at a particular point in time. The progress metric may be based on a comparison of a size, shape, or color of one or more plant(s) within the plant growth operation, with an expected size, shape, or color milestone that is based on the point in time that the sensor data is received.

At 606, the plant grower system may recommend one or more plant grower actions to optimize plant growth, based at least in part on the progress metric. For example, if the sensor data indicates a less than optimal level of plant growth, the one or more plant grower actions may include changing a light intensity or light spectrum of existing lighting, changing an amount of water or a frequency of a watering operation, changing an amount of nutrients or fertilizer, or the ratio of nutrients to fertilizer used within the plant growth operation.

At 608, the plant grower system may determine that the one or more plant grower actions are automated by a controller system of the plant growth operation. In doing so, the plant grower system may transmit a data-set to the controller system that includes parameters for the controller system to implement one or more automated plant grower actions. Automated plant grower actions may include, but are not limited to, controlling and operating light intensity, light spectrum of existing lighting, and controlling and operating an amount of water or watering frequency of a watering operation.

At 610, the plant grower system may determine that the one or more plant grower actions are not automated by a controller system of the plant growth operation. Thus, a plant grower may be required to manually schedule or perform the one or more plant grower actions. Thus, the plant grower system may transmit an indication to a client device of a plant grower that describes the one or more plant grower action(s). In some examples, the indication may also include an alert that notifies the plant grower that plant growth is at a less than optimal level, an optimal level, or an advanced level.

Figure 7:
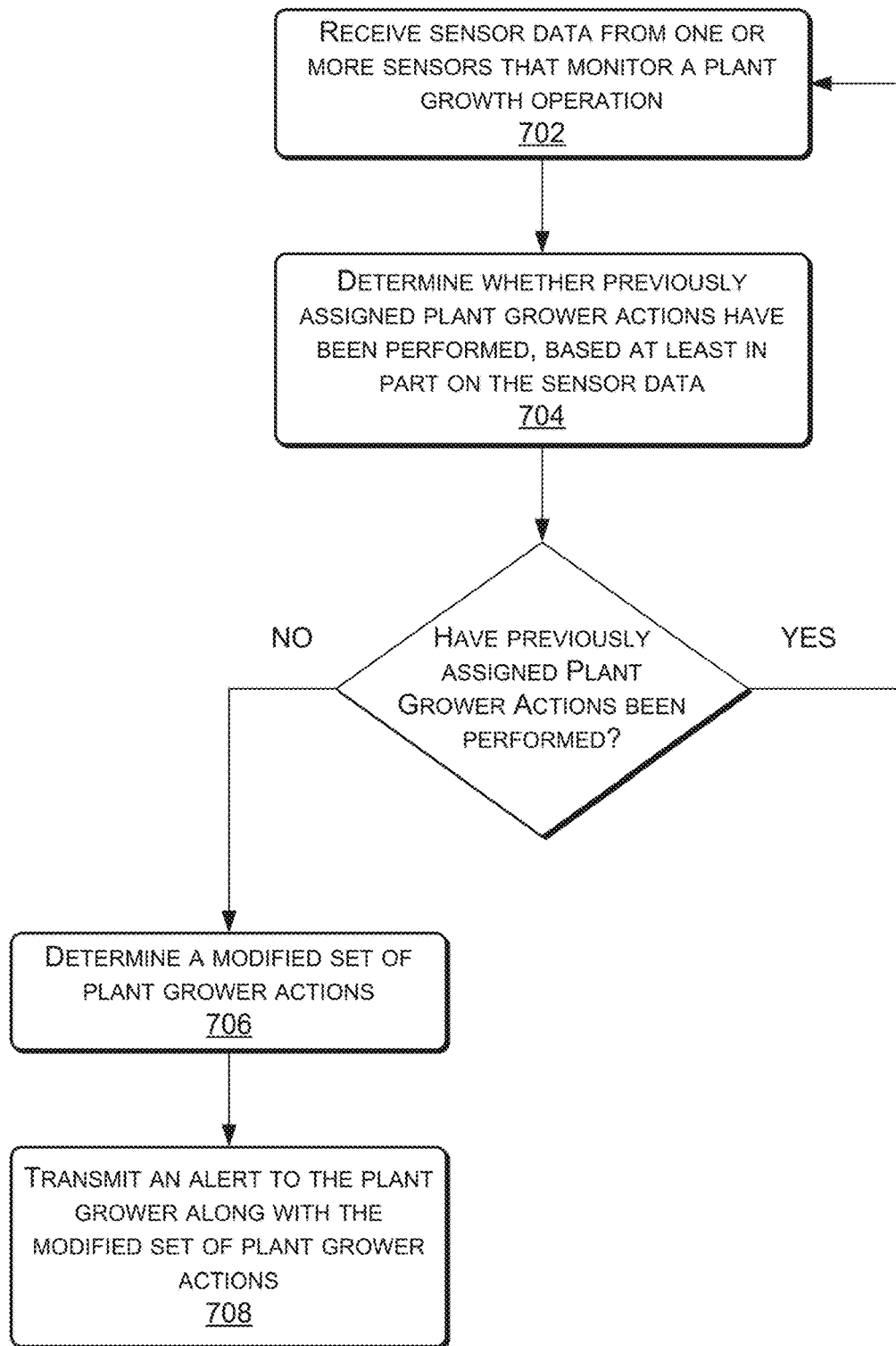
FIG. 7 illustrates is a flow diagram of a process that describes a plant grower system generating a modified set of plant grower actions based on an indication that previously assigned plant grower actions have not been performed.

FIG. 7 illustrates is a flow diagram of a process that describes a plant grower system generating a modified set of plant grower actions based on an indication that previously assigned plant grower actions have not been performed. At 702, the plant grower system may receive sensor data from one or more sensors that monitor a plant growth operation. The sensor data may include measured light intensity, a light spectrum, a proportion of nutrients and fertilizers, an amount of nutrients and fertilizer, an amount of water, and a frequency of a watering operation.

At 704, the plant grower system may determine whether previously assigned plant grower actions have been performed, based at least in part on the sensor data. In some examples, the plant grower system may receive an indication from a controller system of the plant growth operation that an automated plant grower action has been performed. Additionally, or alternatively, the plant grower system may process sensor data to observe performance of the plant grower action. In one non-limiting example, light sensors may measure light intensity or light spectrum at a particular point in time. The plant grower system may then compare the measured data with plant grower actions that mandate a particular light intensity or light spectrum. In another example, processed image sensor data may indicate the performance of other plant grower actions, such as an amount of water and a frequency of a watering operation.

At 706, the plant grower system may determine that previously assigned plant grower actions have not been performed. Continuing with the above example, the plant grower system may determine that the measure light intensity or light spectrum does not match those prescribed by the plant grower actions. In doing so, the plant grower system may determine a modified set of plant grower actions. The modified set of plant grower actions may compensate for the time lapse from when the previously assigned grower actions were intended to be performed. Alternatively, the plant grower system may determine that previously assigned plant grower actions have been performed, based on the sensor data. In doing so, the plant grower system may continue to monitor progress of the plant growth operation.

At 708, the plant grower system may transmit an alert to a client device of the plant grower along with the modified set of plant grower actions. The alert may indicate that previously assigned plant grower actions were not performed, and that a modified set of plant grower actions has been assigned. In some examples, if the plant grower actions were intended to be automated by a controller system of the plant growth operation, data associated with the modified set of plant grower actions may be transmitted to the controller system. At the same time, an alert may be sent to the client device of the plant grower indicating that one or more automated plant grower action(s) were not performed, and that a modified set of plant grower actions has been assigned to the controller system.

Figure 8:
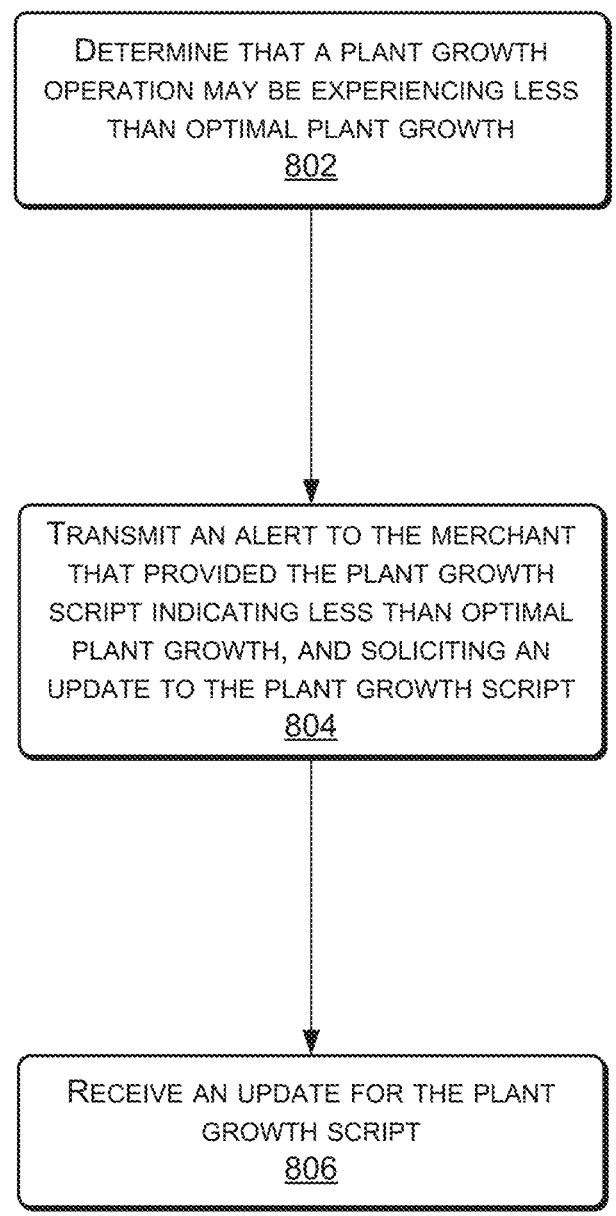
FIG. 8 illustrates is a flow diagram of a process that describes the plant grower system soliciting and receiving an update to a plant growth script based on sub-optimal plant growth data.

FIG. 8 illustrates is a flow diagram of a process that describes the plant grower system soliciting and receiving an update to a plant growth script based on sub-optimal plant growth data. In some examples, the solicitation for an update to the plant growth script occur directly between the plant grower and the merchant that provided the plant growth script, or via the script offering system as an intermediary. At 802, the plant growth system may determine that a plant growth operation may be experiencing less than optimal plant growth. In some examples, the indication may be based on the size, shape, or color of one or more plant(s) within the plant growth operation, relative to expected milestones predicted by a plant growth script.

At 804, the plant grower system may transmit an alert to the merchant that provided the plant growth script indicating less than optimal plant growth, and soliciting an update to the plant growth script. In some examples, the plant grower system may also transmit a plant growth progress data-set that includes sensor data from the plant growth operation over a predetermined period of time. In some examples, the plant grower system may transmit the alert to the merchant via the script offering system as an intermediary. A benefit of doing so may be for the script offering system to timely redirect the alert to an entity other than the merchant that may be responsible for developing updates to plant growth scripts.

At 806, the plant grower system may receive an update for the plant growth script. In doing, the plant grower system may execute the update to the plant growth script to determine a set of modified plant grower actions.

Figure 9:
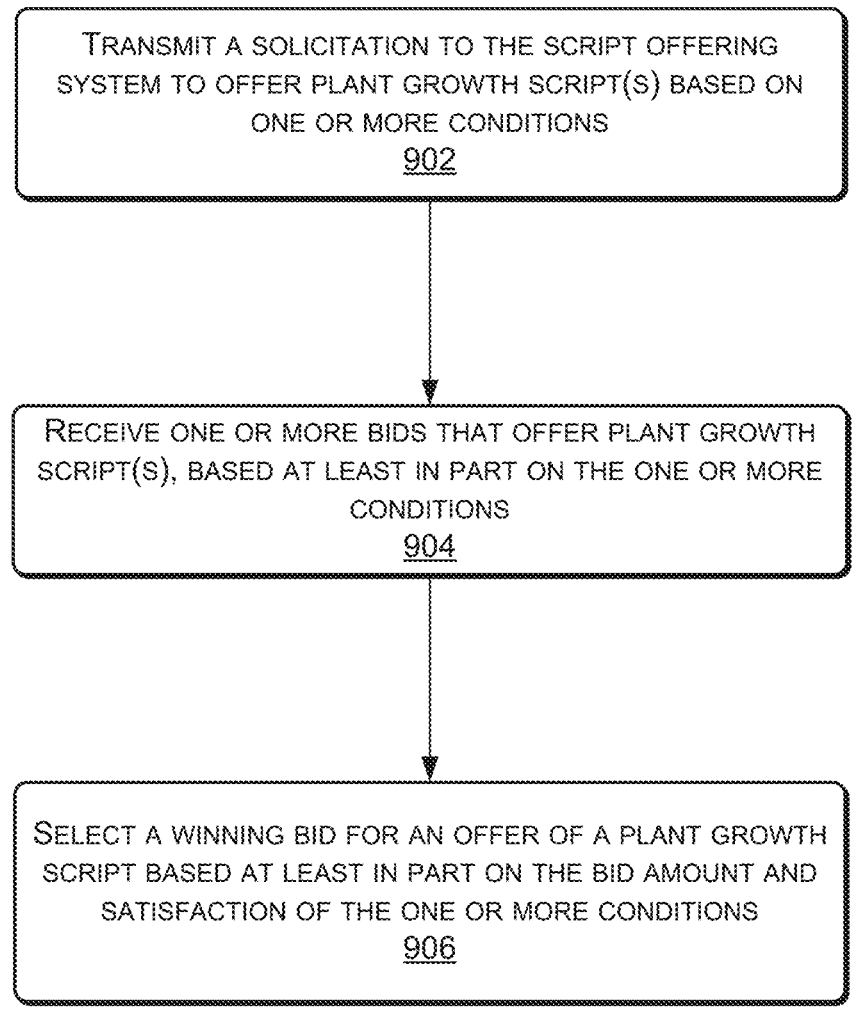
FIG. 9 illustrates is a flow diagram of a process that describes a plant grower system soliciting a script offering system to provide offers for plant growth scripts.

FIG. 9 illustrates a flow diagram of a process that describes a plant grower system soliciting a script offering system to provide offers for plant growth scripts. In some examples, the script offering system may share the solicitation with several merchants that participate in the electronic marketplace, with the aim of allowing each merchant to offer a bid in response to the solicitation. At 902, the plant grower system may transmit a solicitation to the script offering system that requests offers for plant growth script(s). The solicitation may include a description of a particular plant species that is being grown at the plant growth operation. Further, the solicitation may include one or more conditions that solicited bids must meet. For example, the one or more conditions may include a preference to purchase a script rather than licensing a script. Alternatively, the one or more conditions may include a preference to license a script, along with a preferred licensing duration. Other conditions may include a preferred price range, or a minimum satisfaction rating of a plant growth script or the merchant that offers the plant growth script.

In some examples, the solicitation may include a plant growth progress data-set that includes sensor data from a current plant growth operation over a predetermined period of time. In doing so, the solicitation may include a condition that merchant offers should address optimizing plant growth of the current plant growth operation, based on the plant growth progress data set.

At 904, the plant grower system may receive one or more bids from several merchants that offer plant growth scripts, based at least in part on the one or more conditions. Each bid may include a bid amount and merchant conditions associated with fulfillment of a transaction for a plant growth script. The bid amount may correspond to financial remuneration that a merchant is willing to accept as consideration for sale of a plant growth script.

At 906, the plant grower system may select a winning bid for an offer of a plant growth script. In some examples, the winning bid may be selected manually by a plant grower, via a user interface of the plant grower system. In other examples, the winning bid may be automatically selected by the plant grower system, based on one or more criteria such as the lowest cost to the plant grower, fulfilment of plant grower conditions, favorable merchant redemption conditions, and a minimum feedback rating. Favorable redemption conditions may include the duration of a licensing agreement, the availability of technical support, and the provision of script updates during the term of the licensing agreement. A plant grower may configure the plant grower system to prioritize selection of a winning bid for a plant growth script based on favorable redemption conditions relative to one another and also relative to a bid amount. In other words, a plant grower may prioritize fulfillment of all plant grower conditions and a provision of technical support above a lowest cost to the plant grower. In doing so, the plant grower system may automatically select a more expensive plant growth script based on that selection criteria.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
executing a plant growth script that monitors plant growth progress of individual plants within a plant growth operation;
receiving an indication from a controller system of the plant growth operation, that includes a progress metric associated with at least one plant of the individual plants within the plant growth operation;
determining that the at least one plant is experiencing a less than optimal plant growth, based at least in part on the progress metric;
generating one or more actions to optimize the less than optimal plant growth of the at least one plant, wherein the one or more actions include transmitting a request to an electronic marketplace for an additional plant growth script that addresses the less than optimal plant growth; and
transmitting an alert to a client device of a plant grower associated with the plant growth operation, the alert indicating at least the one or more actions that include transmitting the request to the electronic marketplace for the additional plant growth script that addresses the less than optimal plant growth.

2. The computer-implemented method of claim 1, wherein the indication is a first indication, and further comprising:
receiving sensor data from the controller system that relates to the first indication, the sensor data corresponding to the at least one plant, and
wherein the one or more actions include transmitting a second indication to a merchant associated with the plant growth script, the second indication soliciting an update to the plant growth script that addresses the less than optimal plant growth, the second indication further including the sensor data;
receiving, from a merchant device associated with the merchant, an update to the plant growth script based at least in part on the second indication; and
determining the one or more actions based at least in part on the update to the plant growth script.

3. The computer-implemented method of claim 1, further comprising:
receiving sensor data from the controller system that relates to the indication, the sensor data corresponding to the at least one plant;
determining that a performance of a first action of the one or more actions is overdue, based at least in part on the sensor data, wherein the one or more actions include generating a second action of the one or more actions to compensate for the performance of the first action that is overdue.

4. The computer-implemented method of claim 3, wherein the sensor data includes image data that is captured continuously, based on a time lapse sequence, or based on a triggering event.

5. The computer-implemented method of claim 4, wherein the triggering event may include a change in a relative position of an individual plant of the plants with its surroundings, based on an analysis of the image data, or an indication that an environmental data-point has fallen below a predetermined threshold.

6. The computer-implemented method of claim 1, further comprising:
receiving sensor data from the controller system that relates to the indication, the sensor data including environmental data and image data that corresponds to the at least one plant,
wherein the one or more actions include transmitting the sensor data with the request to the electronic marketplace for the additional plant growth script that addresses the less than optimal plant growth.

7. The computer-implemented method of claim 1, wherein the one or more actions include at least one of changing a light intensity or a light spectrum of existing lighting within the plant growth operation, changing an amount of water or a frequency of a watering operation within the plant growth operation, changing an amount of nutrients or fertilizer used within the plant growth operation, or changing a ratio of the nutrients to the fertilizer that is used within the plant growth operation.

8. A plant grower system, comprising:
one or more processors; and
memory coupled to the one or more processors, the memory including one or more modules that are executable by the one or more processors to perform a plurality of acts comprising:
executing a plant growth script that monitors plant growth progress of individual plants within a plant growth operation;
receiving an indication from a controller system of the plant growth operation, that includes a progress metric associated with at least one plant of the individual plants within the plant growth operation;
determining that the at least one plant is experiencing a less than optimal plant growth, based at least in part on the progress metric;
generating one or more actions to optimize the less than optimal plant growth of the at least one plant, wherein the one or more actions include transmitting a request to an electronic marketplace for an additional plant growth script that addresses the less than optimal plant growth; and transmitting an alert to a client device of a plant grower associated with the plant growth operation, the alert indicating at least the one or more actions that include transmitting the request to the electronic marketplace for the additional plant growth script that addresses the less than optimal plant growth.

9. The plant grower system of claim 8, wherein the indication is a first indication, and the plurality of acts further comprise:

receiving sensor data from the controller system that relates to the first indication, the sensor data corresponding to the at least one plant, and wherein the one or more actions include transmitting a second indication to a merchant associated with the plant growth script, the second indication soliciting an update to the plant growth script that addresses the less than optimal plant growth, the second indication further including the sensor data;

receiving, from a merchant device associated with the merchant, an update to the plant growth script based at least in part on the second indication; and determining the one or more actions based at least in part on the update to the plant growth script.

10. The plant grower system of claim 8, wherein the plurality of acts further comprise:

receiving sensor data from the controller system that relates to the indication, the sensor data corresponding to the at least one plant;

determining that a performance of a first action of the one or more actions is overdue, based at least in part on the sensor data, wherein the one or more actions include generating a second action of the one or more actions to compensate for the performance of the first action that is overdue.

11. The plant grower system of claim 10, wherein the sensor data includes image data that is captured continuously, based on a time lapse sequence, or based on a triggering event.

12. The plant grower system of claim 11, wherein the triggering event may include a change in a relative position of an individual plant of the plants with its surroundings, based on an analysis of the image data, or an indication that an environmental data-point has fallen below a predetermined threshold.

13. The plant grower system of claim 8, wherein the plurality of acts further comprise:

receiving sensor data from the controller system that relates to the indication, the sensor data including environmental data and image data that corresponds to the at least one plant, and wherein the one or more actions include transmitting the sensor data with the request to the electronic marketplace for the additional plant growth script that addresses the less than optimal plant growth.

14. The plant grower system of claim 8, wherein the one or more actions include at least one of changing a light intensity or a light spectrum of existing lighting within the plant growth operation, changing an amount of water or a frequency of a watering operation within the plant growth operation, changing an amount of nutrients or fertilizer used within the plant growth operation, or changing a ratio of the nutrients to the fertilizer that is used within the plant growth operation.

15. One or more non-transitory computer-readable media storing computer-executable instructions, that when executed on one or more processors, causes the one or more processors to perform acts comprising:

executing a plant growth script that monitors plant growth progress of individual plants within a plant growth operation;

receiving an indication from a controller system of the plant growth operation, that includes a progress metric associated with at least one plant of the individual plants within the plant growth operation;

determining that the at least one plant is experiencing a less than optimal plant growth, based at least in part on the progress metric;

generating one or more actions to optimize the less than optimal plant growth of the at least one plant, wherein the one or more actions include transmitting a request to an electronic marketplace for an additional plant growth script that addresses the less than optimal plant growth; and transmitting an alert to a client device of a plant grower associated with the plant growth operation, the alert indicating at least the one or more actions that include transmitting the request to the electronic marketplace for the additional plant growth script that addresses the less than optimal plant growth.

16. The one or more non-transitory computer-readable media of claim 15, wherein the indication is a first indication, and the acts further comprise:

receiving sensor data from the controller system that relates to the first indication, the sensor data corresponding to the at least one plant, and wherein the one or more actions include transmitting a second indication to a merchant associated with the plant growth script, the second indication soliciting an update to the plant growth script that addresses the less than optimal plant growth, the second indication further including the sensor data;

receiving, from a merchant device associated with the merchant, an update to the plant growth script based at least in part on the second indication; and determining the one or more actions based at least in part on the update to the plant growth script.

17. The one or more non-transitory computer-readable media of claim 15, wherein the acts further comprise:

receiving sensor data from the controller system that relates to the indication, the sensor data corresponding to the at least one plant;

determining that a performance of a first action of the one or more actions is overdue, based at least in part on the sensor data, wherein the one or more actions include generating a second action of the one or more actions to compensate for the performance of the first action that is overdue.

18. The one or more non-transitory computer-readable media of claim 17, wherein the sensor data includes image data that is captured continuously, based on a time lapse sequence, or based on a triggering event.

19. The one or more non-transitory computer-readable media of claim 15, wherein the acts further comprise:

receiving sensor data from the controller system that relates to the indication, the sensor data including environmental data and image data that corresponds to the at least one plant, wherein the one or more actions include transmitting the sensor data with the request to the electronic marketplace for the additional plant growth script that addresses the less than optimal plant growth.

20. The one or more non-transitory computer-readable media of claim 15, wherein the one or more actions include at least one of changing a light intensity or a light spectrum of existing lighting within the plant growth operation, changing an amount of water or a frequency of a watering operation within the plant growth operation, changing an amount of nutrients or fertilizer used within the plant growth operation, or changing a ratio of the nutrients to the fertilizer that is used within the plant growth operation.

* * * * *